(12) United States Patent
Ohba (10) Patent No.: US 10,291,825 B2
(45) Date of Patent: May 14, 2019

(54) IMAGE FORMING APPARATUS, IMAGE FORMING METHOD, AND COMPUTER READABLE RECORDING MEDIUM STORING IMAGE FORMING CONTROL PROGRAM

(71) Applicant: Konica Minolta, Inc., Chiyoda-ku, Tokyo (JP)

(72) Inventor: Shin Ohba, Aichi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/040,739

(22) Filed: Feb. 10, 2016

(65) Prior Publication Data

US 2016/0241745 A1    Aug. 18, 2016

(30) Foreign Application Priority Data

Feb. 16, 2015   (JP) ................................ 2015-027711

(51) Int. Cl.
*H04N 1/60*        (2006.01)
*G03G 15/00*       (2006.01)
*G06K 15/16*       (2006.01)

(52) U.S. Cl.
CPC ....... *H04N 1/6033* (2013.01); *G03G 15/5062* (2013.01); *G06K 15/16* (2013.01); *H04N 1/6094* (2013.01)

(58) Field of Classification Search
CPC .......................... H04N 1/6033; G03G 15/5062
See application file for complete search history.

(56) References Cited

U.S. PATENT DOCUMENTS

2002/0071693 A1*  6/2002  Shimaoka .......... G03G 21/1825
                                                      399/113
2008/0246982 A1* 10/2008  Kaneko .................... H04N 1/54
                                                        358/1.9
(Continued)

FOREIGN PATENT DOCUMENTS

JP       2008-294554 A     12/2008
JP       2009-088821 A      4/2009
JP       2013-246722 A     12/2013

OTHER PUBLICATIONS

Office Action (Notification of Reasons for Refusal) dated Feb. 15, 2017, by the Japanese Patent Office in corresponding Japanese Patent Application No. 2015-027711, and an English translation of the Office Action. (7 pages).

*Primary Examiner* — Ibrahim Siddo
(74) *Attorney, Agent, or Firm* — Buchanan Ingersoll & Rooney PC (57) ABSTRACT

An image forming apparatus has an image forming unit that prints an image on a transfer medium, a conveying unit that conveys the transfer medium, a storage unit that stores a target color profile and a transfer medium profile; and a control unit that controls the storage unit and the image forming unit, and the control unit enables printing of a test chart at the image forming unit based on the target color profile and has a color adjustment function of, when receiving colorimetric data obtained by measuring color of the test chart, comparing the colorimetric data with data of a target chart based on the target color profile and enabling color adjustment of the image forming unit based on a comparison result, and, when obtaining a result after the color adjustment, storing information relating to the result after the color adjustment in association with a transfer medium profile.

17 Claims, 5 Drawing Sheets

(56) References Cited

U.S. PATENT DOCUMENTS

| | | | | |
|---|---|---|---|---|
| 2008/0291498 A1* | 11/2008 | Yano | ............... | H04N 1/6033 |
| | | | | 358/3.1 |
| 2009/0322824 A1* | 12/2009 | Hori | ............... | B41J 2/16585 |
| | | | | 347/30 |
| 2011/0157612 A1* | 6/2011 | Ming | ............... | G06F 3/1211 |
| | | | | 358/1.9 |
| 2011/0304863 A1* | 12/2011 | Shibuya | ........... | H04N 1/6033 |
| | | | | 358/1.9 |
| 2014/0293300 A1* | 10/2014 | Teraue | ............ | H04N 1/6036 |
| | | | | 358/1.9 |

\* cited by examiner

IMAGE FORMING APPARATUS, IMAGE FORMING METHOD, AND COMPUTER READABLE RECORDING MEDIUM STORING IMAGE FORMING CONTROL PROGRAM

CROSS-REFERENCE TO RELATED APPLICATIONS

The present application claims priority under 35 U.S.C. § 119 to Japanese Patent Application No. 2015-027711, filed Feb. 16, 2015. The contents of this application are incorporated herein by reference in their entirety.

BACKGROUND OF THE INVENTION

Field of the Invention

The present invention relates to an image forming apparatus which can perform output with color adapted to a color profile, an image forming method and a computer readable recording medium storing an image forming control program.

Description of the Related Art

When printing is performed at an image forming apparatus, typically, an image is formed using an output profile adapted to the apparatus or a general-purpose output profile. Meanwhile, there is a request for performing printing using target color requested by a user or standard target color. In response to such a request, a target color profile targeted for printing is acquired, and color of an image which is desired to be printed is converted based on the target color profile, so that printing can be performed using an output profile of the image forming apparatus.

For example, according to Japanese Patent Laid-Open No. 2013-246722, even when image quality requested by a customer is not explicit, a printed matter with optimal balance of quality, cost and delivery date can be provided according to a request from the customer. An image quality index indicating quality of the printed matter with a numerical value and evaluation by the customer are registered in a history database in association with each other, so that printing is performed while an optimal printer is selected.

Meanwhile, an image quality level sometimes depends on paper, for example, depends on a type of paper, basis weight, or the like. For example, even a high image quality level which cannot be realized using plain paper can be realized using coated paper of higher quality than that of the plain paper. The user desires to select paper with which a desired image quality level can be realized. Further, the user also desires to know a degree of color precision on the printed paper.

However, with the conventional image forming apparatus, because relevance between an image quality level and paper is not taken into account, it is difficult to select appropriate paper according to the image quality level, and it is impossible to know a degree of color precision on the printed paper. While, in Japanese Patent Laid-Open No. 2013-246722, a printer can be selected based on image quality, or the like, it does not take into account printing at a desired quality level at the image forming apparatus.

The present invention has been made in view of the above-described circumstances, and is intended to provide an image forming apparatus which enables printing adapted to a target color profile to be performed according to property of a transfer medium, an image forming method and a computer readable recording medium storing an image forming control program.

SUMMARY OF THE INVENTION

To achieve at least one of the abovementioned objects, an image forming apparatus reflecting one aspect of the present invention includes:

an image forming unit configured to print an image on a transfer medium based on image data, a conveying unit configured to convey the transfer medium, a storage unit configured to store a target color profile and a transfer medium profile, and a control unit configured to control the storage unit and the image forming unit, and the control unit enables printing of a test chart at the image forming unit based on the target color profile, and has a color adjustment function of, when receiving colorimetric data obtained by measuring color of the test chart, comparing the colorimetric data with data of a target chart based on the target color profile and enabling color adjustment of the image forming unit based on a comparison result, and when receiving a result after the color adjustment, storing information relating to the result after the color adjustment in the storage unit in association with the transfer medium profile.

In the image forming apparatus according to the above-mentioned aspect, it is preferable that the control unit stores an adjustment value in the color adjustment in the storage unit in association with the transfer medium profile.

In the image forming apparatus according to the above-mentioned aspect, it is preferable that the control unit receives colorimetric data obtained by measuring color of the test chart printed by the image forming unit based on the target color profile after the color adjustment, and compares the colorimetric data with data of the target chart to obtain information relating to a result after the color adjustment.

In the image forming apparatus according to the above-mentioned aspect, it is preferable that the information relating to the result after the color adjustment includes an image quality level.

In the image forming apparatus according to the above-mentioned aspect, it is preferable that the image quality level is a color difference.

In the image forming apparatus according to the above-mentioned aspect, it is preferable that the information relating to the result after the color adjustment includes information for identifying the target color profile.

In the image forming apparatus according to the abovementioned aspect, it is preferable that a plurality of target color profiles are stored in the storage unit, and the information relating to the result after the color adjustment is stored for each of the target color profiles in the storage unit in association with the transfer medium profile.

In the image forming apparatus according to the abovementioned aspect, it is preferable that the transfer medium profile is created for each transfer medium attribute which affects color reproducibility.

In the image forming apparatus according to the abovementioned aspect, it is preferable that the transfer medium attribute which affects the color reproducibility is one or both of a type and basis weight of the transfer medium.

In the image forming apparatus according to the abovementioned aspect, it is preferable that the adjustment value in the color adjustment is stored in the transfer medium profile in association with the transfer medium attribute caused by the color reproducibility.

In the image forming apparatus according to the abovementioned aspect, it is preferable that, when color is adjusted according to the transfer medium attribute, the control unit collectively updates information relating to a result after the color adjustment of transfer medium profiles having the same transfer medium attribute and having different transfer medium sizes.

In the image forming apparatus according to the abovementioned aspect, it is preferable that the image forming apparatus further includes a color measuring unit configured to measure color of the image on the transfer medium, and the color measuring unit is electrically connected to the control unit so as to transmit the measured colorimetric data to the control unit.

In the image forming apparatus according to the abovementioned aspect, it is preferable that the control unit performs the color adjustment so that color of the test chart matches color of the target chart.

To achieve at least one of the abovementioned objects, an image forming method reflecting one aspect of the present invention includes:

a step of printing a test chart at an image forming unit based on a target color profile, a step of obtaining colorimetric data by measuring color of the test chart, a step of comparing the colorimetric data with data of a target chart based on the target color profile, a step of performing color adjustment of the image forming unit based on a comparison result of the data, and a step of storing information relating to a result after the color adjustment in a storage unit in association with a transfer medium profile.

To achieve at least one of the abovementioned objects, a computer readable non-transitory recording medium storing an image forming control program reflecting one aspect of the present invention is a computer readable recording medium storing the image forming control program to be executed by a control unit configured to control an image forming apparatus, and the image forming control program includes:

a step of printing a test chart at an image forming unit based on a target color profile, a step of obtaining colorimetric data by measuring color of the test chart, a step of comparing the colorimetric data with data of a target chart based on the target color profile, a step of performing color adjustment of the image forming unit based on a comparison result of the data, and a step of storing information relating to a result after the color adjustment in a storage unit in association with a transfer medium profile.

DETAILED DESCRIPTION OF THE PREFERRED EMBODIMENT

One embodiment of the present invention will be described below.

Figure 1:
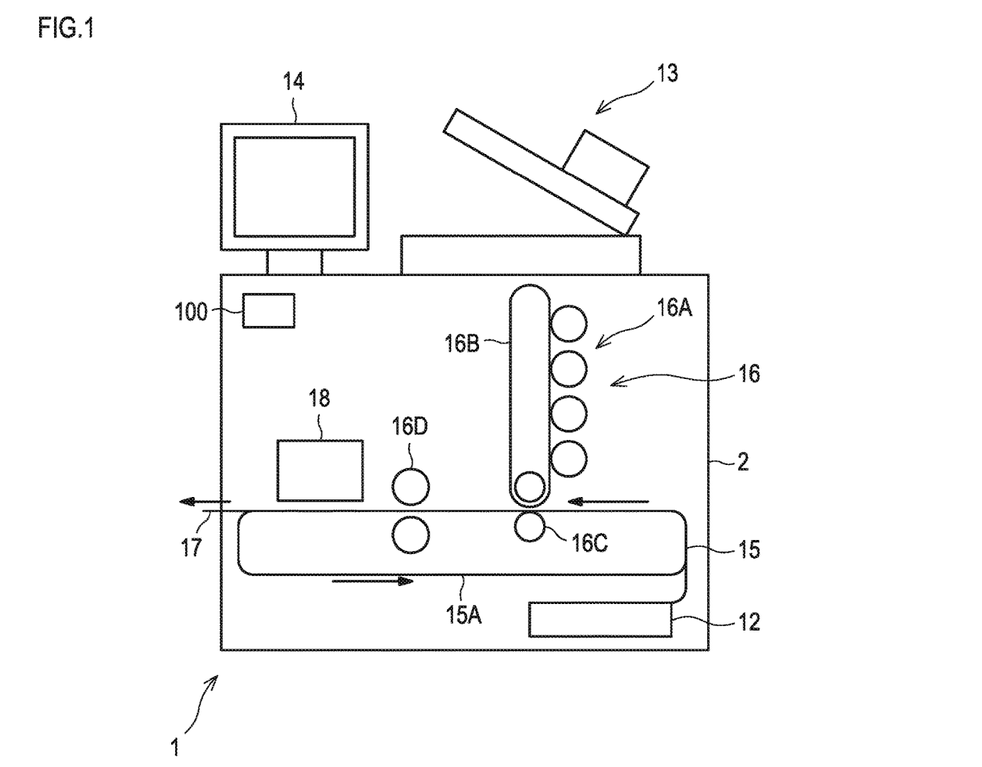
FIG. 1 is a mechanical schematic diagram illustrating an image forming apparatus according to one embodiment of the present invention.

A mechanical outline of an image forming apparatus 1 according to one embodiment of the present invention will be described based on FIG. 1.

Figure 2:
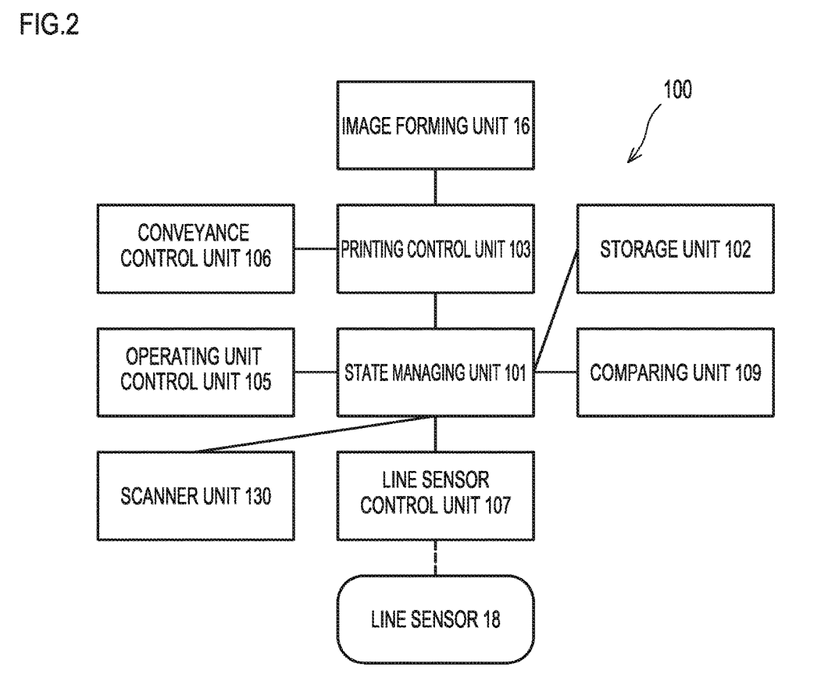
FIG. 2 is a functional block diagram of a control unit according to one embodiment of the present invention.

In the image forming apparatus 1, an automatic document feeder (ADF) 13 is provided on an upper side of an image forming apparatus body 2, and an image of a document fed by the automatic document feeder (ADF) 13 can be read at a scanner unit 130 illustrated in FIG. 2. It should be noted that the document can be also read on a platen glass.

Further, on the upper side of the image forming apparatus body 2, a display unit 14 is provided at a portion where the platen glass is not located. The display unit 14 which is configured with an LCD and a touch panel, allows operation by a user and can display information. In this embodiment, the display unit 14 is both used for operation and display. It should be noted that it is also possible to configure an operating unit with a mouse, a tablet, or the like, and configure the operating unit separately from the display unit.

At a lower side of the image forming apparatus body 2, a paper feed tray 12 for storing and feeding paper is disposed.

The paper feed tray 12 can be configured to have multiple stages. In this embodiment, paper corresponds to a transfer medium of the present invention. It should be noted that the transfer medium is not limited to paper, and a material of the transfer medium is not limited as long as an image can be printed on the transfer medium and the transfer medium can be conveyed.

A conveyance path 15 for conveying paper fed from the paper feed tray 12 is provided inside the image forming apparatus body 2, and an image forming unit 16 is provided in the course of the conveyance path within the image forming apparatus body 2. The image forming unit has a photoreceptor 16A for each color, an intermediate transfer belt 16B, and a secondary transferring unit 16C, and, around the photoreceptor 16A, a charger, an LD and a developer for each color, which are not illustrated, are disposed. Further, a fixer 16D is disposed on the conveyance path 15 at a downstream side of the secondary transferring unit 16C. In this embodiment, the conveyance path 15 configures a conveying unit of the present invention with a conveyance roller, a drive motor, or the like, which are not illustrated.

On a downstream side of the fixer 16D, the conveyance path 15 extends and is connected to a paper discharging unit 17. As the paper discharging unit 17, a paper discharge tray, or the like, can be provided as is, or the paper discharging unit 17 can be connected to a conveyance path of a post-processing apparatus which is not illustrated.

Further, the conveyance path 15 has an inverted conveyance path 15A which branches on the downstream side of the fixer 16D and converges with the conveyance path 15 on an upstream side of the image forming unit 16. The inverted conveyance path 15A has a mechanism for inverting paper (not illustrated). The paper inverted by the inverted conveyance path 15A is returned to the conveyance path 15 on the upstream side of the image forming unit 16 through the inverted conveyance path 15A, so that an image can be printed on a back side of the paper.

At the image forming unit 16, a surface of the photoreceptor 16A is uniformly charged by the charger before an image is written, and an electrostatic latent image is formed on the photoreceptor 16A by irradiating the photoreceptor 16A whose surface is uniformly charged with a laser by an image writing unit. The developer develops the electrostatic latent image formed on the photoreceptor 16A with a toner material. Through this development processing, a toner image is formed on the photoreceptor 16A. The toner image on the photoreceptor 16A is transferred to the intermediate transfer belt 16B, and the toner image is transferred by the secondary transferring unit 16C on paper conveyed from the paper feed tray 12. The paper on which the toner image is transferred is conveyed along the conveyance path 15 and reaches the fixer 16D.

The toner material remaining at the photoreceptor 16A and the intermediate transfer belt 16B is removed by a cleaning unit which is not illustrated.

The fixer 16D fixes the toner image transferred on a surface side of the paper as an output image by heating the conveyed paper. Through this fixing, printing of an image on the paper is completed.

The paper subjected to fixing processing is discharged to the paper discharging unit 17 as is through the conveyance path 15 or returned to the conveyance path on the upstream side of the image forming unit 16 after inverted through the inverted conveyance path 15A. On the inverted paper, an image can be printed on a back side of the paper by the image forming unit 16.

Further, a line sensor 18 for measuring color of an image on the paper conveyed through the conveyance path is provided between the fixer 16D and a branching point of the conveyance path 15. It should be noted that a CIS (contact image sensor), or the like, can be used as a configuration for color measurement, and arrangement of sensors is not particularly limited to arrangement of the line sensor as long as color of the image on the paper can be measured. The line sensor 18 or the CIS corresponds to a color measuring unit of the present invention.

It should be noted that while, in this embodiment, the image forming apparatus 1 includes the line sensor 18 for measuring color of the image on the paper, it is also possible to provide a color measuring unit for measuring color of the image on the paper outside the image forming apparatus 1, and the color measuring unit can be offline with the image forming apparatus 1 as long as colorimetric data can be obtained. At the offline color measuring unit, the colorimetric data can be extracted from the color measuring unit by a removable storage memory and can be read out at the image forming apparatus. Further, in place of the color measuring unit mechanically connected to the image forming apparatus, it is also possible to employ a color measuring unit electrically connected to the image forming apparatus through a network, a serial cable, or the like, instead of being mechanically connected.

Functional blocks of a control unit 100 and its peripheral are illustrated in FIG. 2.

A state managing unit 101 controls the whole of the image forming apparatus 1 and recognizes a state of the whole image forming apparatus 1. A storage unit 102 is connected to the state managing unit 101. The storage unit 102 has a ROM for storing a program, or the like, a RAM which becomes a working area, a non-volatile memory such as a flash memory and an HDD which stores data in a non-volatile manner, or the like. In the non-volatile memory, an image forming control program and other programs executed by the control unit 100, an operating parameter of the image forming apparatus, a target color profile, measured colorimetric data, an adjustment value used for adjusting an image, a paper profile, an output profile, or the like, are stored so as to be able to be read and written.

A control CPU 113 which controls the whole of the image forming apparatus 1 and recognizes a state of the whole image forming apparatus, performs image forming control, calculation of image preparation time, setting of an image interval, or the like. That is, the control CPU 113 functions as part of a control unit of the present invention.

The image forming control program of the present invention can be introduced by a removable non-volatile memory instead of being stored in the non-volatile memory in advance.

As described above, the scanner unit 130 is connected to the state managing unit 101 so as to be able to be controlled. At the scanner unit 130, a document is read, and image data is acquired and transmitted to the state managing unit 101. The state managing unit 101 performs data processing on the image data as necessary and stores the image data in the storage unit 102.

Further, a printing control unit 103 is connected to the state managing unit 101. The image forming unit 16 is connected to the printing control unit 103 so as to be able to be controlled. The printing control unit 103 can read out image data from the storage unit 102, form an image on paper by controlling the image forming unit 16, and perform color adjustment as necessary.

The state managing unit 101 can control the image forming unit 16 to print a test chart based on information of the target color profile stored in the storage unit 102. The target color profile holds information for printing the test chart.

Because the state managing unit 101 converts color of device-independent image data into color of image forming apparatus-dependent image data in order to print the test chart based on the target color profile, printing is performed based on the output profile of the image forming apparatus 1. If an adjustment value of image formation is set, printing is performed by performing adjustment using this adjustment value.

A conveyance control unit 106 is connected to the state managing unit 101. The conveyance control unit 106 controls the conveying unit which conveys the paper fed from the paper feed tray 12. The conveying unit is configured with the conveyance path 15, the inverted conveyance path 15A, a conveyance roller on the conveyance path, a motor which drives the conveyance roller, or the like.

A line sensor control unit 107 is connected to the state managing unit 101. The line sensor control unit 107 controls operation of the line sensor 18, receives colorimetric data of the paper read by the line sensor 18, and transmits the colorimetric data to the state managing unit 101.

A comparing unit 109 is connected to the state managing unit 101 so as to be able to be controlled. The comparing unit 109 obtains a color difference, or the like, by comparing colorimetric data measured by the line sensor 18 and acquired by the state managing unit 101 for the paper on which the test chart is printed, with data of a target chart included in the target color profile stored in the storage unit 102. The color difference is transmitted to the state managing unit 101.

The state managing unit 101 has a color adjustment function of performing color adjustment of the image forming unit 16 based on the color difference. The color adjustment function can be a function of automatically performing color adjustment of the image forming unit when the color difference is obtained, or can be a function which is implemented by an instruction from an operator through the display unit 14. The color adjustment function is implemented so as to minimize a color difference between the test chart and the target chart. The adjustment value for color adjustment is stored in the storage unit 102 in association with the paper profile. Further, when recording is performed for each paper medium, the adjustment value is stored in the storage unit 102 for each paper medium.

When the adjustment value is stored in the storage unit 102 in association with the paper profile, data to be associated can be recorded as an item of the paper profile or data including the data to be associated can be recorded as data other than the paper profile.

While an estimate value of the color difference after color adjustment can be obtained through calculation, the color difference can be obtained by printing a test chart at the image forming unit 16 after the color adjustment, measuring color of the test chart at the line sensor 18, and, after obtaining colorimetric data, comparing the colorimetric data with the target chart at the comparing unit 109. Through this process, it is possible to recognize the color difference accurately. The color difference is stored in the storage unit 102 in association with the paper profile. Further, when recording is performed for each paper medium, the color difference is stored in the storage unit 102 for each paper medium.

When the color difference is stored in the storage unit 102 in association with the paper profile, data to be associated can be recorded as an item of the paper profile, or data including the data to be associated can be recorded as data other than the paper profile.

Figure 3:
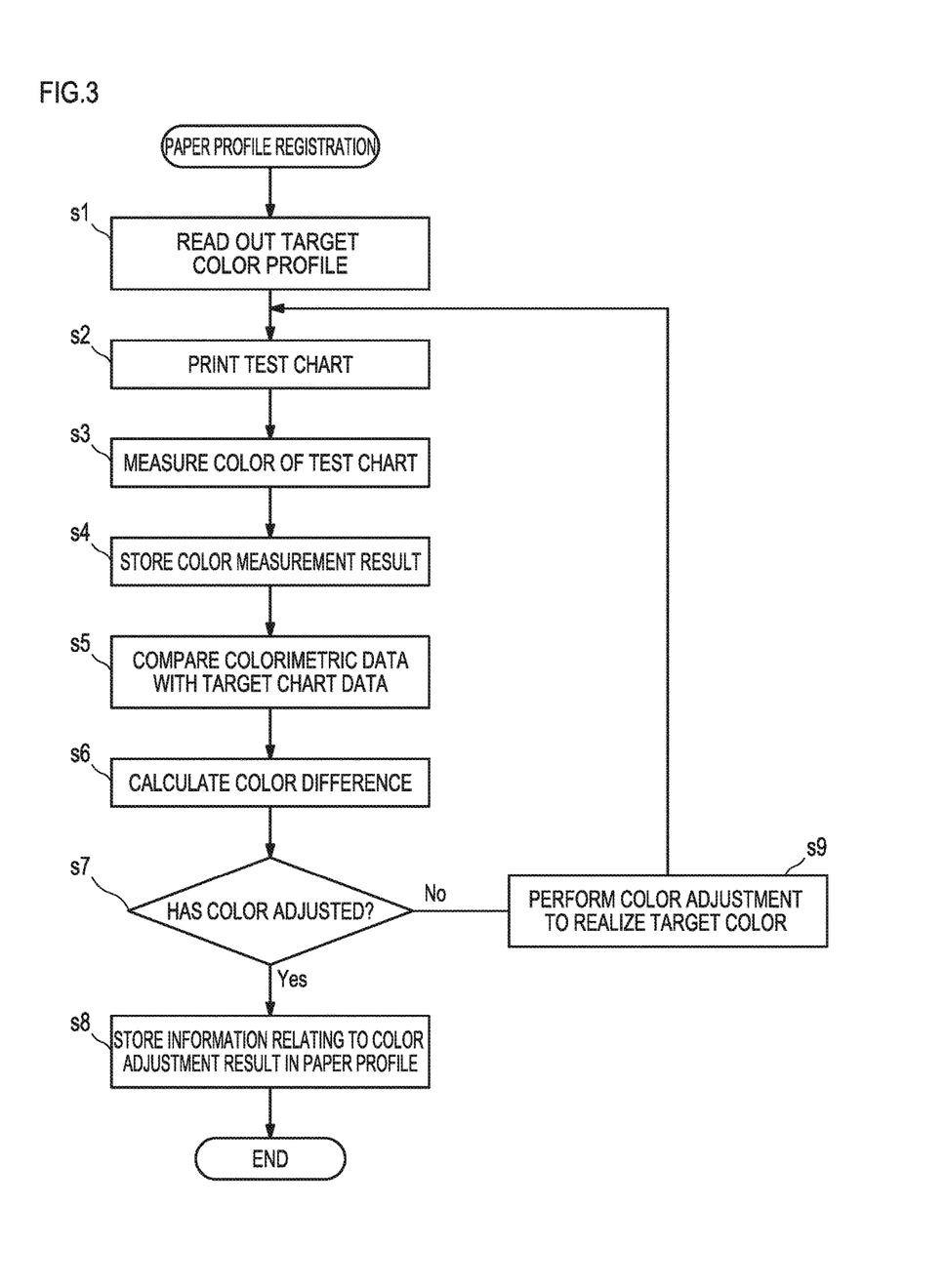
FIG. 3 is a flowchart for explaining procedure of storing a color difference in a paper profile after color adjustment according to one embodiment of the present invention.

Procedure for storing a color difference in the paper profile after the above-described color adjustment will be described next based on the flowchart of FIG. 3. It should be noted that the following procedure is executed by control by the control unit 100.

First, a target color profile is read out from the storage unit 102 (step s1). The target color profile can be acquired in advance or acquired from those stored in a network, a removable storage memory, or the like. The acquired target color profile is once stored in the storage unit 102.

After the target color profile is read out from the storage unit 102, a test chart is printed at the image forming unit 16 based on the target color profile (step s2). The paper profile of the paper of the test chart is recognized at the control unit 100. The paper on which the test chart is printed is conveyed through the conveyance path 15, and an image is read by the line sensor 18, so that colorimetric data can be obtained (step s3). The colorimetric data is transmitted to the state managing unit 101 and once stored in the storage unit 102 (step s4).

The state managing unit 101 reads out the colorimetric data and data of the target chart based on the target color profile from the storage unit 102, and passes these data to the comparing unit 109. The target chart is included in the target color profile and provided.

The comparing unit 109 compares the both data (step s5), and sends out a comparison result to the state managing unit 101. The state managing unit 101 calculates a color difference from the comparison result (step s6) and judges whether color has been adjusted (step s7). If color has not been adjusted (step s7: No), color adjustment of the image forming unit is implemented so that the test chart has target color (step s9), the test chart is printed, and a color difference is calculated (steps s2 to s6).

In step s7, when it is judged that color has been adjusted (step s7: Yes), information relating to color adjustment is stored in the paper profile (step s8), and the procedure is finished. The information relating to a color adjustment result is a color difference and a target color profile name in this example. Examples of the target profile name include, for example, JapanColor (Trademark, the same applies hereafter) and SNAP (Trademark, the same applies hereafter). The target color profile name corresponds to information for identifying the target color profile.

The information relating to the color adjustment result is recorded in association with the paper profile. In this example, the information relating to the color adjustment result is recorded within the paper profile. However, the information relating to the color adjustment result can be recoded as other data associated with the paper profile. The paper profile corresponds to a transfer medium profile of the present invention.

Further, the adjustment value in color adjustment is stored in the storage unit in association with the paper profile.

When the adjustment value is associated with the paper profile, the adjustment value is further stored in the storage unit for each paper attribute. The paper attribute corresponds to a transfer medium attribute in the present invention.

Figure 4:
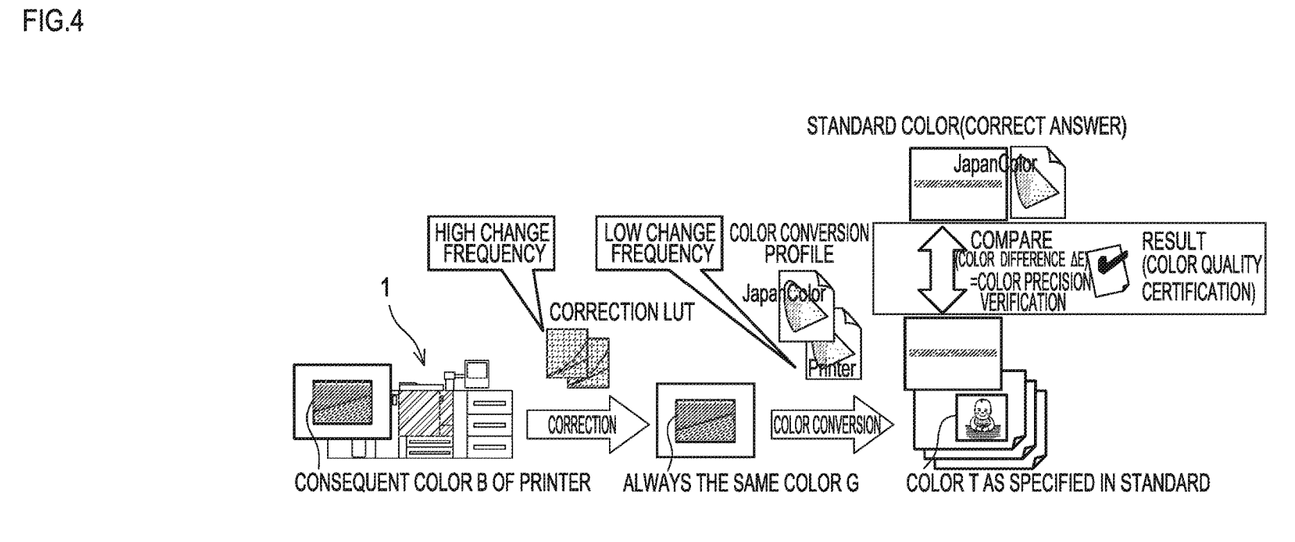
FIG. 4 is a diagram for explaining a form of printing based on a color profile according to one embodiment of the present invention.

FIG. 4 schematically illustrates a form in which printing is performed based on the color profile at the image forming apparatus.

At the image forming apparatus 1, normally, contrast adjustment and γ correction are performed on consequent color B of the printer using a correction LUT (lookup table), so that always the same color G is obtained. The correction LUT is changed with high frequency.

Always the same color G is printed according to the consequent color B of the image forming apparatus using a Printer profile (output profile). The output profile is less frequently changed.

On the other hand, when the color profile (for example, JapanColor) specified in the standard is used, the consequent color B of the printer is converted from device dependent image data into device independent image data based on the color profile (color conversion profile), and printed according to the output profile, so that color as specified in the standard can be obtained.

When printing is performed according to the standard, while a color difference becomes small at the image forming apparatus 1, the color difference varies depending on paper used for printing. The color difference at that time can be known from the paper profile by referring to the paper profile. If this color difference (Δ) falls within the standard through color precision verification, it is possible to easily certify quality of the color.

Data content of the paper profile will be specifically described next.

Table 1 indicates a paper profile table in which paper profile data is stored. This table is displayed at the display unit 14 by call of the paper profile. It should be noted that a paper attribute key is not displayed.

In the paper profile table, a paper profile name is provided for each registration No., and items of a paper size, a paper attribute key, a paper type, basis weight, a target profile name, color difference data (image quality level), and paper color are provided to each registration No. The target profile name and the color difference data are recoded as information relating to a result after color adjustment. Color differences are respectively provided to profiles 1 to 3 according to the target profile of JapanColor. Color difference becomes larger for a larger numerical value of the color difference data. The color difference data indicates different numerical values according to the paper type and the basis weight which affect color reproducibility. In a profile 4, a color difference is provided according to the target file of SNAP.

In the paper attribute table, different key numbers are provided as paper attributes based on the paper type and the basis weight, and, specifically, in Table 2, the paper types and the basis weight are respectively designated in key numbers 1 to 9.

In each paper attribute key, an adjustment value table is associated with the paper profile through the paper attribute key. The adjustment value table has items of the paper attribute key and a printer output file, content of which is indicated in Table 3. Gamma correction as the adjustment value is provided according to the paper attribute. Further, the printer output profile is set for each paper attribute key. The printer output profile can include an adjustment value for color adjustment.

TABLE 1

PAPER PROFILE TABLE

| REGISTRATION No. | PAPER PROFILE NAME | SIZE | PAPER ATTRIBUTE KEY | PAPER TYPE | BASIS WEIGHT | TARGET PROFILE NAME | COLOR DIFFERENCE DATA (IMAGE QUALITY LEVEL) | PAPER COLOR |
|---|---|---|---|---|---|---|---|---|
| 1 | PROFILE 1 | A4 | 2 | PLAIN PAPER | 75-80 g/m$^2$ | Japan Color | Δ4 | WHITE COLOR |
| 2 | PROFILE 2 | A3 | 9 | COATED PAPER | 81-91 g/m$^2$ | Japan Color | Δ1 | WHITE COLOR |
| 3 | PROFILE 3 | B5 | 4 | HIGH-QUALITY PAPER | 62-74 g/m$^2$ | Japan Color | Δ2 | WHITE COLOR |
| 4 | PROFILE 4 | Letter | 9 | COATED PAPER | 81-91 g/m$^2$ | SNAP | Δ2 | WHITE COLOR |

TABLE 2

PAPER ATTRIBUTE TABLE CAUSED BY COLOR REPRODUCIBILITY

| MAIN KEY | PAPER TYPE | BASIS WEIGHT |
|---|---|---|
| 1 | PLAIN PAPER | 62-74 g/m$^2$ |
| 2 | PLAIN PAPER | 75-80 g/m$^2$ |
| 3 | PLAIN PAPER | 81-91 g/m$^2$ |
| 4 | HIGH-QUALITY PAPER | 62-74 g/m$^2$ |
| 5 | HIGH-QUALITY PAPER | 75-80 g/m$^2$ |
| 6 | HIGH-QUALITY PAPER | 81-91 g/m$^2$ |
| 7 | COATED PAPER | 62-74 g/m$^2$ |
| 8 | COATED PAPER | 75-80 g/m$^2$ |
| 9 | COATED PAPER | 81-91 g/m$^2$ |

TABLE 3

ADJUSTMENT VALUE TABLE

| PAPER ATTRIBUTE KEY | GAMMA CORRECTION | PRINTER OUTPUT PROFILE |
|---|---|---|
| 2 | DATA 1 | DATA A |
| 9 | DATA 2 | DATA B |
| 4 | DATA 3 | DATA C |

Figure 5:
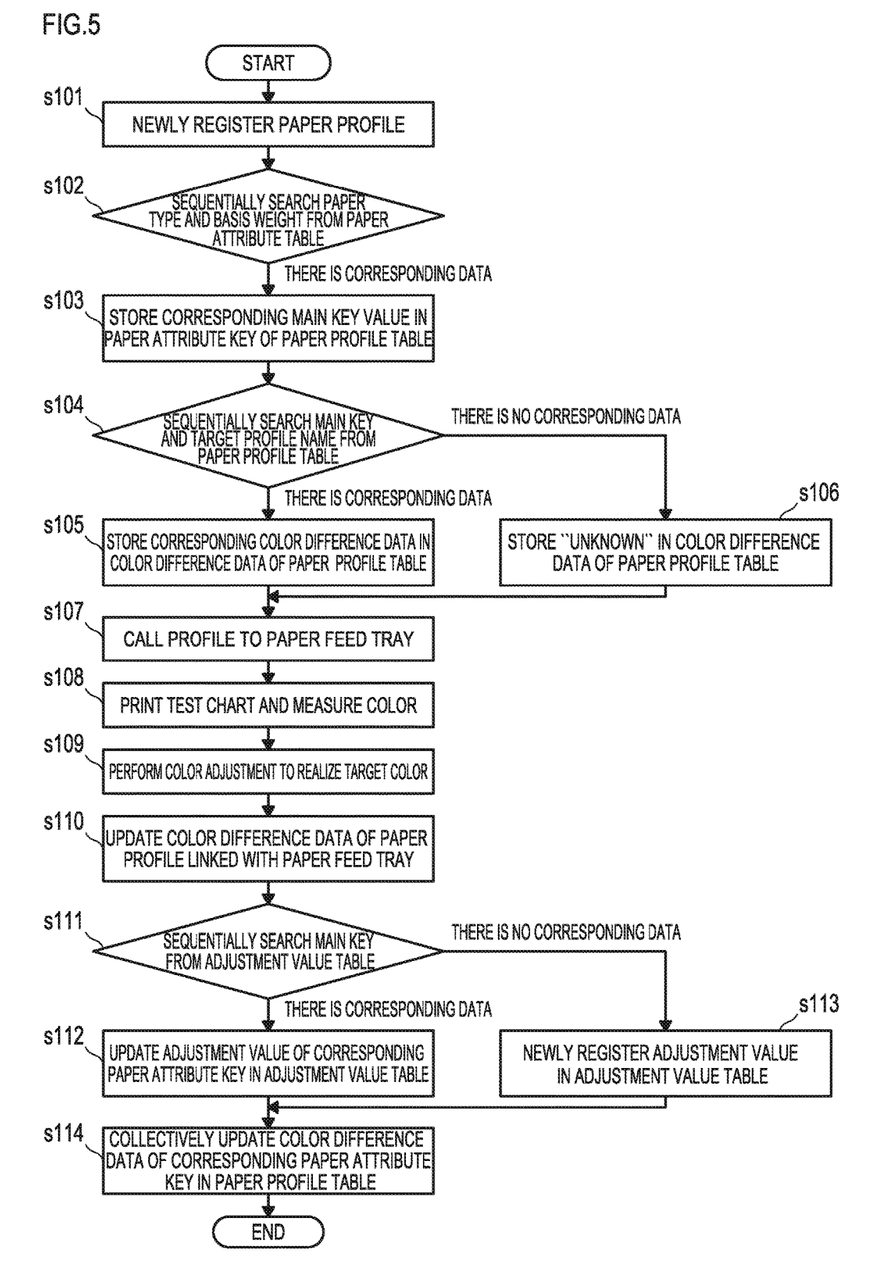
FIG. 5 is a flowchart illustrating procedure for registering a new paper profile according to one embodiment of the present invention.

Procedure for registering a new paper profile will be described next based on the flowchart of FIG. 5. In this example, a case will be described where, as indicated in Table 1, four paper profiles are registered in a paper profile screen, and, when a fifth paper profile is newly registered, adjustment values and color difference data of other paper profiles having the same paper attribute key as that of the fifth paper profile are collectively updated.

First, a new profile is newly registered in the storage unit (step s101). An example of the new profile 5 is indicated in Table 4. In the paper profile, a paper size, a paper type and basis weight are set.

TABLE 4

| REGISTRATION No. | PAPER PROFILE NAME | SIZE | PAPER ATTRIBUTE KEY | PAPER TYPE | BASIS WEIGHT | TARGET PROFILE NAME | COLOR DIFFERENCE DATA (IMAGE QUALITY LEVEL) | PAPER COLOR |
|---|---|---|---|---|---|---|---|---|
| 5 | PROFILE 5 | Invoice | UNKNOWN | COATED PAPER | 81-91 g/m$^2$ | SNAP | UNKNOWN | WHITE COLOR |

A paper type and basis weight are sequentially searched from the paper attribute table (step s102). In this example, as indicated in Table 4, data whose paper type is "coated paper" and whose basis weight is "81-91/m²" is searched from the paper attribute table.

If there is corresponding data, the procedure proceeds to the next step, and, if there is no corresponding data, it is possible to add the corresponding paper type and basis weight to the paper attribute table.

That is, when there is corresponding data (step s102: there is corresponding data), a corresponding main key value is stored in a paper attribute key of the paper profile table (step s103).

In this example, as indicated in Table 5, "9" is automatically inputted to the paper attribute key from the paper attribute table indicated in Table 2.

of the paper profile linked with the paper feed tray is updated by the obtained color difference (step s110). For example, if a color difference after color adjustment is Δ1, color difference data of the profile 5 is changed from "Δ2" to "Δ1".

Then, a main key is sequentially searched from the adjustment value table (step s111). For example, when data of the profile 5 is updated, data whose main key is "9" is searched from the adjustment value table of Table 3.

If there is corresponding data (step s111: there is corresponding data), an adjustment value of the corresponding paper attribute key in the adjustment value table is updated (step s112). If there is no corresponding data (step s111, there is no corresponding data), an adjustment value is newly registered in the adjustment value table (step s113).

TABLE 5

| REGISTRATION No. | PAPER PROFILE NAME | SIZE | PAPER ATTRIBUTE KEY | PAPER TYPE | BASIS WEIGHT | TARGET PROFILE NAME | COLOR DIFFERENCE DATA (IMAGE QUALITY LEVEL) | PAPER COLOR |
| --- | --- | --- | --- | --- | --- | --- | --- | --- |
| 5 | PROFILE 5 | Invoice | 9 | COATED PAPER | 81-91 g/m² | SNAP | UNKNOWN | WHITE COLOR |

A main key and a target profile name are sequentially searched from the paper profile data next (step s104). If there is corresponding data (step s104: there is corresponding data), corresponding color difference data is stored in the color difference data of the paper profile table (step s105). As a result of the above search, if there is no corresponding data (step s104: there is no corresponding data), "unknown" is stored in the color difference data of the paper profile table (step s106).

In this example, in step s104, data whose main key is "9" and whose target profile is "SNAP" is searched from the paper profile table, and, in step s105, if there is another corresponding paper profile, as indicated in Table 6, the color difference data is set as a default value of the color difference data of the profile 5.

After steps s112 or step s113, color difference data of the corresponding paper attribute key in the paper profile table is collectively updated (step s114), and the procedure is finished.

In this example, color difference data whose paper attribute key is "9" in the paper profile table is collectively updated. The color difference data is collectively updated assuming that the paper size does not affect color reproducibility.

As described above, according to the present embodiment, it is possible to perform printing adapted to the target color profile according to selection of a transfer medium, and it is possible to provide an advantage that a level of color precision on a transfer medium on which printing is performed can be easily known.

TABLE 6

| REGISTRATION No. | PAPER PROFILE NAME | SIZE | PAPER ATTRIBUTE KEY | PAPER TYPE | BASIS WEIGHT | TARGET PROFILE NAME | COLOR DIFFERENCE DATA (IMAGE QUALITY LEVEL) | PAPER COLOR |
| --- | --- | --- | --- | --- | --- | --- | --- | --- |
| 5 | PROFILE 5 | Invoice | 9 | COATED PAPER | 81-91 g/m² | SNAP | Δ2 | WHITE COLOR |

After step s105 or step s106, predetermined paper (in this example, "Invoice") is set at the paper feed tray, and a paper profile (in this example, the profile 5) is called and set (step s107).

A test chart is printed using the paper (in this example, "Invoice" paper) at the above-described paper feed tray, and color of the test chart is measured using the line sensor (step s108). Colorimetric data obtained through color measurement is compared with data of the target chart, and color adjustment is implemented on the image forming unit so that the test chart has target color (step s109). After color adjustment, a test chart is printed and color is measured in a similar manner, and a color difference is obtained in a similar manner as described above. The color difference data While the present invention has been described above based on the above-described embodiment, the present embodiment can be changed as appropriate without deviating from the scope of the present invention.

What is claimed is:

1. An image forming apparatus comprising:
    an image forming unit configured to print an image on a transfer medium based on image data;
    a conveying unit configured to convey the transfer medium;
    a storage unit configured to store a target color profile and a plurality of transfer medium profiles; and hardware processor configured to:
control the storage unit and the image forming unit,
enable the image forming unit to print a test chart based on the target color profile,
receive colorimetric data obtained by measuring color of the test chart formed on the transfer medium,
compare the colorimetric data with data of a target chart based on the target color profile,
upon receipt of a result of comparing the colorimetric data with data of the target chart, determine whether the target color profile has been adjusted for the printed test chart;
prepare a color adjustment of the image forming unit based on both a comparison result of the colorimetric data with data of the target chart, and the transfer medium, and
after the target color profile has been adjusted, store information relating to the color adjustment in the storage unit in association with a transfer medium profile corresponding to the transfer medium being conveyed;
wherein the information relating to the result after the color adjustment includes an image quality level.

2. The image forming apparatus according to claim 1, wherein the hardware processor stores an adjustment value in the color adjustment in the storage unit in association with the transfer medium profile.

3. The image forming apparatus according to claim 1, wherein the hardware processor receives colorimetric data obtained by measuring color of the test chart printed by the image forming unit based on the target color profile after the color adjustment, and compares the colorimetric data with data of the target chart to obtain information relating to a result after the color adjustment.

4. The image forming apparatus according to claim 1, wherein the image quality level is a color difference.

5. The image forming apparatus according to claim 1, wherein the information relating to the result after the color adjustment includes information for identifying the target color profile.

6. The image forming apparatus according to claim 1, wherein a plurality of target color profiles are stored in the storage unit, and the information relating to the result after the color adjustment is stored for each of the target color profiles in the storage unit in association with the transfer medium profile.

7. The image forming apparatus according to claim 1, wherein the transfer medium profile is created for each transfer medium attribute which affects color reproducibility.

8. The image forming apparatus according to claim 7, wherein the transfer medium attribute which affects the color reproducibility is one or both of a type and basis weight of the transfer medium.

9. The image forming apparatus according to claim 7, wherein the adjustment value in the color adjustment is stored in the transfer medium profile in association with the transfer medium attribute caused by the color reproducibility.

10. The image forming apparatus according to claim 1, wherein, when color is adjusted according to the transfer medium attribute, the hardware processor collectively updates information relating to a result after the color adjustment of transfer medium profiles having the same transfer medium attribute and having different transfer medium sizes.

11. The image forming apparatus according to claim 1, further comprising:
a color measuring unit configured to measure color of the image on the transfer medium,
wherein the color measuring unit is electrically connected to the hardware processor so as to transmit the measured colorimetric data to the hardware processor.

12. The image forming apparatus according to claim 1, wherein the hardware processor performs the color adjustment so that color of the test chart matches color of the target chart.

13. The image forming apparatus according to claim 1 further comprising:
a line sensor configured to measure color of the image on the transfer medium along a paper conveyance path after fixing.

14. An image forming method comprising:
a step of printing a test chart at an image forming unit based on a target color profile;
a step of obtaining colorimetric data by measuring color of the test chart formed on a transfer medium;
a step of comparing the colorimetric data with data of a target chart based on the target color profile;
a step of determining whether the target color profile has been adjusted for the printed test chart;
a step of performing color adjustment of the image forming unit based on both a comparison result of the data and the transfer medium; and
after the target color profile has been adjusted, a step of storing information relating to a result after the color adjustment in a storage unit in association with a transfer medium profile from a plurality of transfer medium profiles, the transfer medium profile corresponding to the transfer medium being conveyed;
wherein the information relating to the result after the color adjustment includes an image quality level.

15. The image forming method according to claim 14 further comprising a step of measuring color of the image along a paper conveyance path after fixing.

16. A computer readable recording medium which is a computer readable non-transitory recording medium storing an image forming control program executed by a control unit controlling an image forming apparatus, the image forming control program comprising:
a step of printing a test chart at an image forming unit based on a target color profile;
a step of obtaining colorimetric data by measuring the test chart formed on the transfer medium;
a step of comparing the colorimetric data with data of a target chart based on the target color profile;
a step of determining whether the target color profile has been adjusted for the printed test chart;
a step of performing color adjustment of the image forming unit based on both a comparison result of the data and the transfer medium; and
after the target color profile has been adjusted, a step of storing information relating to a result after the color adjustment in a storage unit in association with a transfer medium profile from a plurality of transfer medium profiles, the transfer medium profile corresponding to the transfer medium being conveyed;
wherein the information relating to the result after the color adjustment includes an image quality level.

17. The computer readable recording medium storing the image forming control program according to claim 16, the image forming control program further comprising a step of measuring color of the image along a paper conveyance path after fixing.

\* \* \* \* \*